Sept. 30, 1958 R. P. HERZFELD ET AL 2,853,924
EYEGLASS FRAMES
Filed July 25, 1956
2 Sheets-Sheet 1

RICHARD P. HERZFELD
HARRY J. COLLINS
INVENTORS

BY
John W. Michael
ATTORNEY

Sept. 30, 1958 R. P. Herzfeld et al 2,853,924
EYEGLASS FRAMES
Filed July 25, 1956
2 Sheets-Sheet 2

RICHARD P. HERZFELD
HARRY J. COLLINS
INVENTORS

BY John W. Michael
ATTORNEY

United States Patent Office 2,853,924
Patented Sept. 30, 1958

2,853,924

EYEGLASS FRAMES

Richard P. Herzfeld and Harry J. Collins, Milwaukee, Wis.; said Collins assignor to said Herzfeld Application July 25, 1956, Serial No. 599,950

1 Claim. (Cl. 88—53)

This invention relates to an improved eyeglass frame. There are many people who frequently put on and remove their glasses. When the glasses are not in use they are generally folded and placed in a case or pocket. When the glasses are again put on the temples must be manually moved to the wearing position. This operation grows somewhat tedious whereas the folding of the temples preparatory to placing the glasses in a case is much easier.

The principal object of this invention is to spring load the temples of eyeglass frames to the wearing position to thus eliminate the tedious aspect of frequent putting on and taking off of glasses.

Another object is to provide a spring loading mechanism for the described use which is inconspicuous and will not catch or snag cleaning tissues and the like.

Still another object is to provide a spring loading for the temples of eyeglass frames which will be readily adaptable to almost any style frame.

In the two embodiments shown, we place either a coil or leaf spring so as to pass behind the customary hinge pin and have its ends bearing against the adjacent temple and the frame member (referred to in the trade as the "front") to thereby bias the temples outwardly to the wearing position. With proper selection of the spring force the temples will swing into wearing position readily and yet will not unduly resist manual return to the folded position.

Other objects and advantages will be pointed out in, or be apparent from, the specification and claim, as will obvious modifications of the two embodiments shown in the drawings, in which:

Figure 2:
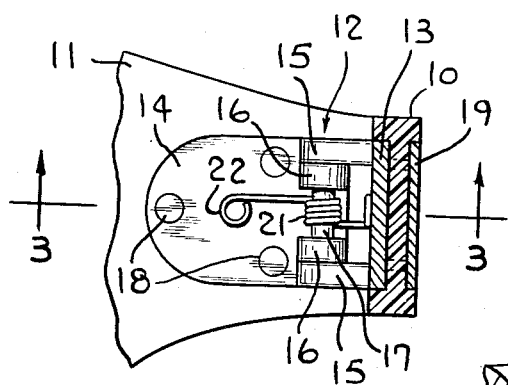
Fig. 2 is a plan view of the structure shown in Fig. 1.
Figure 1:
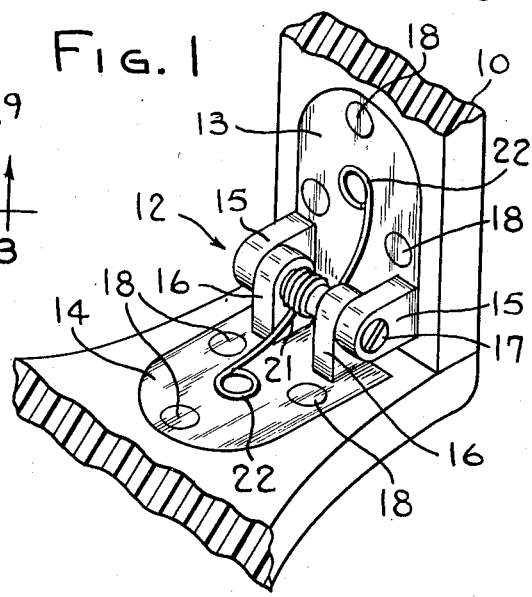
Fig. 1 is an enlarged fragmentary perspective view of one form of the spring loaded hinge connection between the temple and the front with the temple in the wearing position.
Figure 3:
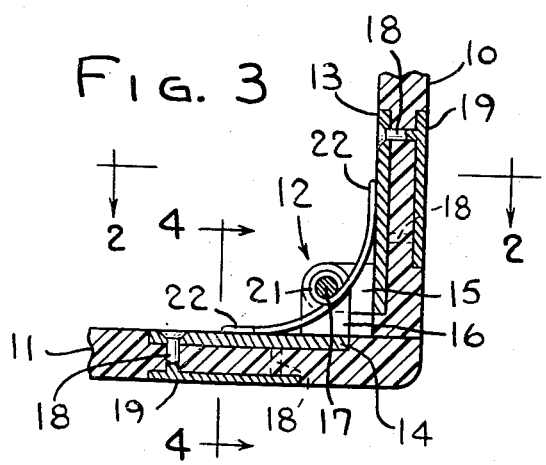
Fig. 3 is a view taken along line 3—3 of Fig. 2.
Figure 4:
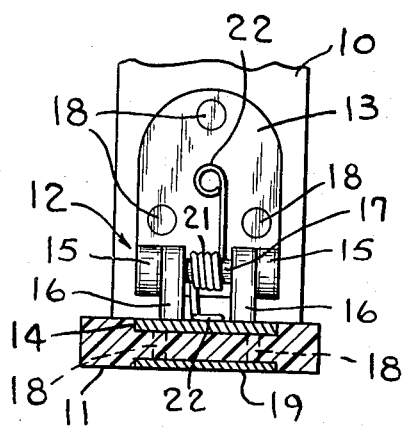
Fig. 4 is a view taken along line 4—4 of Fig. 3.
Figure 5:
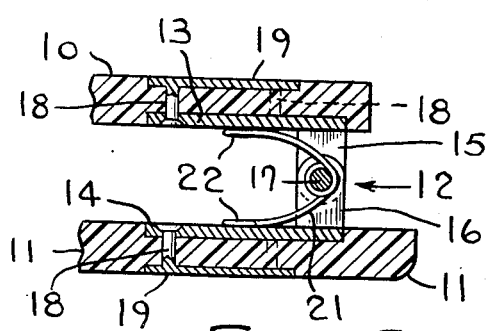
Fig. 5 is the same view as Fig. 3 except with the temple in the folded position.
Figure 7:
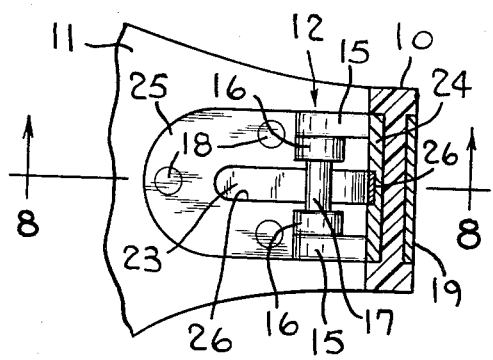
Fig. 7 is a plan view of the modification shown in Fig. 6.
Figure 6:
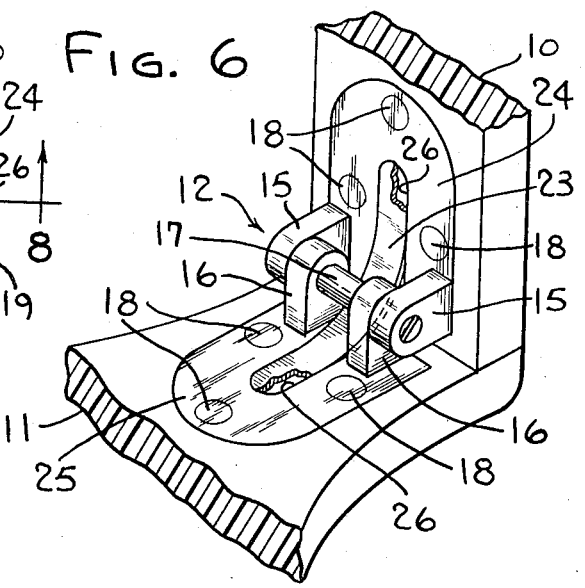
Fig. 6 is an enlarged fragmentary perspective view of another form of hinge connection.
Figure 8:
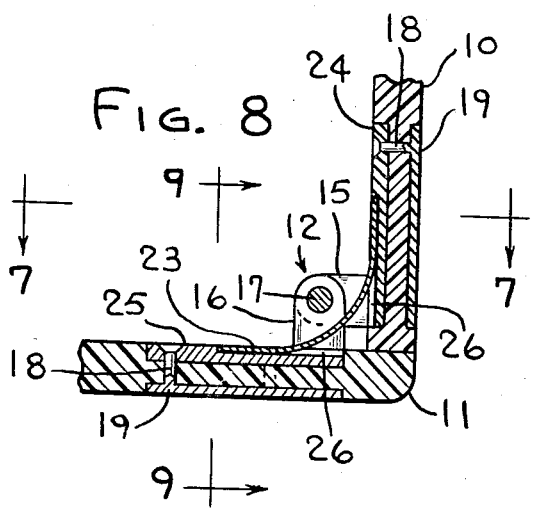
Fig. 8 is a view taken along line 8—8 of Fig. 7.
Figure 9:
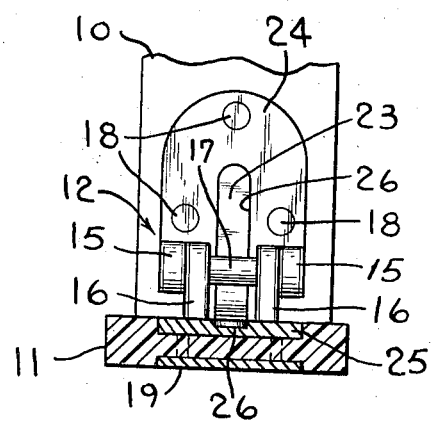
Fig. 9 is a view taken along line 9—9 of Fig. 8.
Figure 10:
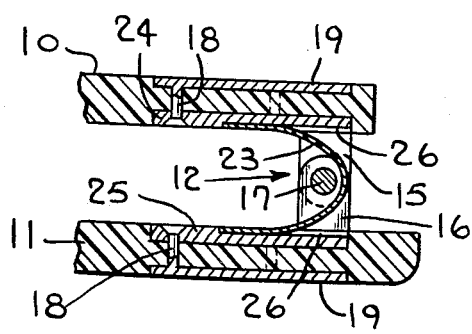
Fig. 10 is the same as Fig. 9 except with the temple in the folded position.

Referring to Figs. 1–5 of the drawings which show the preferred embodiment of the invention, temple 10 and front 11 of an eyeglass frame are connected by hinge 12. Hinge 12 includes hinge plates 13 and 14 with upright ears 15, 15 and 16, 16, respectively, provided with aligned apertures receiving hinge pin 17. Hinge pin 17 is held in place by a threaded connection between one end of the pin and the left ear 15 (Fig. 1). Ears 15, 15 extend from the outer edges of plate 13 while ears 16, 16 project from plate 14 a short distance in from the edges of the plate and are spaced apart to expose the center portion of hinge pin 17. Hinge plates 13 and 14 are attached to temple 10 and front 11 by rivets 18 passing through the frame material into plates 19, 19 positioned on the opposite surfaces of the temple and front.

Wire spring 21 is wound around hinge pin 17 with its ends bearing against temple 10 and front 11 to bias the temple from the folded position (Fig. 5) to the wearing position (Figs. 1, 2, 3 and 4). The ends of spring 21 are curled as at 22 to prevent snagging of clothing, cleaning tissues, and the like. Spring 21 is designed so the pressure exerted on the temples and front will readily swing the temples from folded to wearing position and yet will not unduly resist normal return to the folded position. The spring force can be adjusted by varying the number of windings on hinge pin 17 and by varying the size or material of the wire.

The modification shown in Figs. 6–10 is similar to the embodiment previously described in that a portion of the loading spring passes behind the hinge pin 17. In this embodiment a leaf spring 23 is positioned behind hinge pin 17 and is prevented from moving out of position by engagement with recesses 26 in hinge plates 24 and 25. These recesses in effect capture the leaf spring aided by the resiliency of the spring. The recesses also permit slight endwise movement of the spring during flexure of the spring. The spring force in this form can be modified through selection of the spring itself.

Although the views in the drawings show only the hinged connection between one temple and one end of the front, it should be understood that both hinges are spring loaded.

It is apparent from the foregoing description that eyeglasses constructed in accordance with this invention can be taken from their place of storage and placed on the face quickly and effortlessly. It can be done with only one hand and without the usual fumbling and handling involved when putting on an ordinary pair of eyeglasses. The result is a substantial improvement in the convenience of handling, particularly where the nature of the use is such that requires frequent removal and application of the eyeglasses during the course of the day.

Although but two embodiments of the present invention have been illustrated and described, it will be apparent to those skilled in the art that various changes and modifications may be made therein without departing from the spirit of the invention or the scope of the appended claim.

We claim:

An eyeglass frame comprising a front, a pair of temples, a hinge connecting each temple to the front, each hinge including a pair of hinge plates and a hinge pin connecting said plates for pivotal movement, each hinge pin being offset from the general plane of the front and from the plane of the respectively adjacent temples to dispose said hinge pins in spaced relation to the front and to the respective temples, and means including a leaf spring disposed in each of said spaces between the respective hinge pins and the adjacent parts of the frame, said hinge plates each being provided with a recess in one face thereof, said recesses extending longitudinally of the plates and transversely of the respective hinge pins, said leaf springs each including terminal portions seated in the recesses of the respective hinge plates, each said spring being loaded so that the force of the spring operates to urge the associated temple into wearing position, each plate recess being formed with an end wall facing the associated hinge pin, said end walls forming abutments against which the terminal portions of the respective springs are engaged.

References Cited in the file of this patent

UNITED STATES PATENTS

| | | |
|---|---|---|
| 1,297,019 | Seckendorf | Mar. 11, 1919 |
| 2,674,158 | Curtet | Apr. 6, 1954 |

FOREIGN PATENTS

| | | |
|---|---|---|
| 270,560 | Great Britain | May 12, 1927 |
| 277,372 | Switzerland | Dec. 1, 1951 |